United States Patent [19]

Friend

[11] Patent Number: 4,635,215
[45] Date of Patent: Jan. 6, 1987

[54] ARTICLE OR SEED COUNTER

[75] Inventor: Kenneth D. Friend, Cedar Falls, Iowa

[73] Assignee: Deere & Company, Moline, Ill.

[21] Appl. No.: 649,108

[22] Filed: Sep. 10, 1984

[51] Int. Cl.$^4$ .................. G01N 21/00; G01N 21/85; G01V 9/04

[52] U.S. Cl. .................. 364/555; 364/564; 250/221; 250/222.1; 250/222.2; 377/6

[58] Field of Search ............... 364/555, 564; 250/221, 250/222.1, 222.2; 377/6, 10

[56] References Cited

U.S. PATENT DOCUMENTS

| | | | |
|---|---|---|---|
| 3,527,928 | 9/1970 | Ryder et al. | 377/6 |
| 3,900,718 | 8/1975 | Seward | 364/555 |
| 3,927,400 | 12/1975 | Knepler | 377/6 |
| 3,965,340 | 6/1976 | Renner et al. | 364/555 |
| 4,021,117 | 5/1977 | Göhde et al. | 364/555 |
| 4,225,930 | 9/1980 | Steffen | 364/555 |
| 4,333,096 | 6/1982 | Jenkins et al. | 364/555 |
| 4,491,241 | 1/1985 | Knepler et al. | 364/555 |
| 4,528,680 | 7/1985 | Archambeault | 377/6 |
| 4,555,624 | 11/1985 | Steffen | 250/222.2 |

Primary Examiner—Felix D. Gruber
Assistant Examiner—Danielle B. Laibowitz

[57] ABSTRACT

A sensor for counting articles, such as seeds, moving through a conduit includes an array of infrared LEDs generating a uniform diffuse beam of radiation which entirely illuminates a cross sectional volume of the conduit. The beam is detected by a planar photo diode which extends across the opposite side of the conduit. A pair of mirrors extend along opposite sides of the conduit between the array and the photo diodes. Slits narrow the beam and limit the amount of radiation which can impinge upon the photo diode. The signal from the photo diode is integrated by a signal processing unit so that the sensor can count a plurality of seeds in a group of seeds which simultaneously pass through the beam. The signal processing unit automatically compensates for changes in the steady state photo-diode output and for changes in seed size.

9 Claims, 11 Drawing Figures

ARTICLE OR SEED COUNTER

BACKGROUND OF THE INVENTION

This invention relates to an article counter or sensor for sensing and counting articles such as seeds flowing in a chute in a seed planter and, in particular, to the signal processing unit of such a sensor.

Optical seed sensors in which a seed interrupts a radiation or light beam are known in the art. Such systems are described in U.S. Pat. Nos. 4,163,507 (Bell), 3,537,091 (Schenkenberg), 3,928,751 (Fathauer), 3,723,989 (Fathauer et al), 4,166,948 (Steffen), 3,974,377 (Steffen) and 4,246,469 (Merlo). For a number of reasons, such seed sensors have been inaccurate. One problem has been the spatial non-uniformity of the light source and/or of the light detectors so that signals generated by the light detectors vary, depending upon what portion of the light beam is interrupted. Another problem is that such sensors have usually been coupled to circuits, such as the differentiating circuit of U.S. Pat. No. 4,163,507, which essentially count pulses in the detector output and therefore, such systems count a plurality of seeds simultaneously traversing the light beam as a single seed.

SUMMARY OF THE INVENTION

An object of the present invention is to provide an accurate sensor for counting small articles, such as seeds, flowing through a conduit.

Another object of the present invention is to provide an article counter which can sense and count a plurality of articles in a group of articles which simultaneously pass through the sensor.

Another object of this invention is to provide a beam detector-type article sensor with a signal processing unit which automatically compensates for changes in the steady-state output of the detector.

Another object of the present invention is to provide an article or seed counter with a signal processing unit which automatically compensates for gradual changes in average article or seed size.

Another object of the invention is to determine the time spacing between the articles for use in testing of planter seed metering devices.

Another object is to ignore articles too small to be the ones monitored.

These and other objects are achieved by the present invention which includes an array of infrared LEDs extending across one side of an article or seed conduit. The array generates a substantially diffuse and uniform radiation beam which is detected by planar photo diodes which extend across the opposite side of the conduit. A pair of oppositely facing mirrors extend between the array and the photo diodes and reflect the LED radiation back into the conduit. Slits between the array and the conduit and between the conduit and the photo diodes narrow the beam which the articles or seeds traverse and prevent extraneous radiation from impinging upon the photo diodes.

With the diffuse, uniform and extended radiation beam produced by the LED array, all articles or seeds passing through the detector have nearly equal effect on the amount of radiation received by the photo diodes, even when multiple articles or seeds are tightly bunched together, even when multiple articles pass simultaneously through the beam, and even when one article is in the partial "shadow" of another article which is between the one article and the array. The signal from the photo diodes has a substantially linear relationship to the total amount of radiation which falls on them, and thus, also has a similar relationship to the quantity of articles or seeds which interrupt the beam inside the detector.

The signal from the photo diodes is processed by an electronic unit which includes a current-to-voltage converter, an A/D converter and a microprocessor. The microprocessor executes an algorithm which accurately counts the articles which pass through the beam by repetitively integrating a value derived from the signal from the photo diodes. The algorithm compensates for changes in the steady-state signal produced by the photo diodes when no articles are in transit through the beam, and determines the number of articles in groups of articles which simultaneously pass through the beam. The algorithm also compensates for gradual changes in average article size.

DETAILED DESCRIPTION

Figure 1:
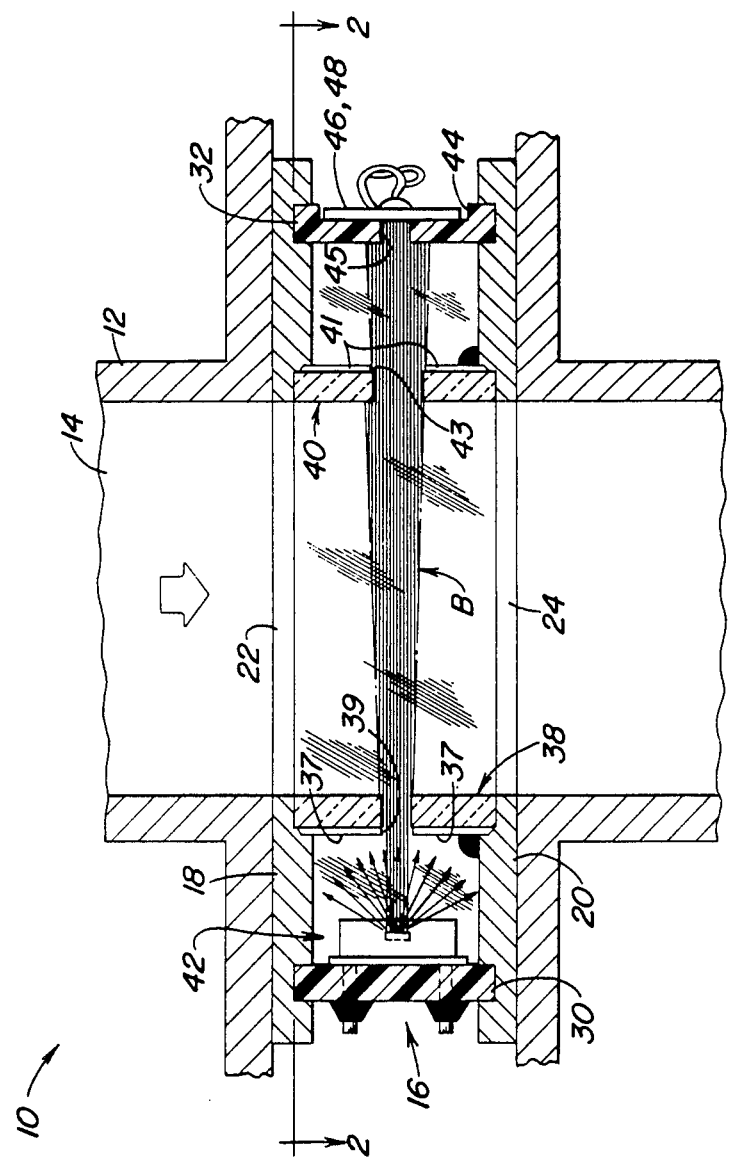
FIG. 1 is a sectional side view of a beam-type article or seed sensor.

An article or seed sensor 10 includes a conduit 12 which forms an article or seed flow passage 14 and which receives a sensor module 16. Sensor module 16 includes a top 18 and a base 20, each having rectangular openings 22 and 24 which register with the seed flow passage 14.

The sensor module 16 also includes opaque end plates 26 and 28 (see FIG. 2), opaque side plates 30 and 32, mirrors 34 and 36, and glass windows 38 and 40, all held in grooves on the inner surfaces of the top 18 and base 20.

The side plate 30 supports an array 42 (at least 3 and preferably 7) of radiation generators CR1–CR7. Various known radiation emitting devices could be suitable, but infrared light generators are preferred because of the dust-penetrating ability of infrared radiation. A suitable device is the Siemens No. SFH 407-3 GaAs infrared light emitting diode (LED). Preferably, plate 30 is a PC board with conductive strips forming electrical connections with the LEDs CR1–CR7 mounted thereon.

Figure 2:
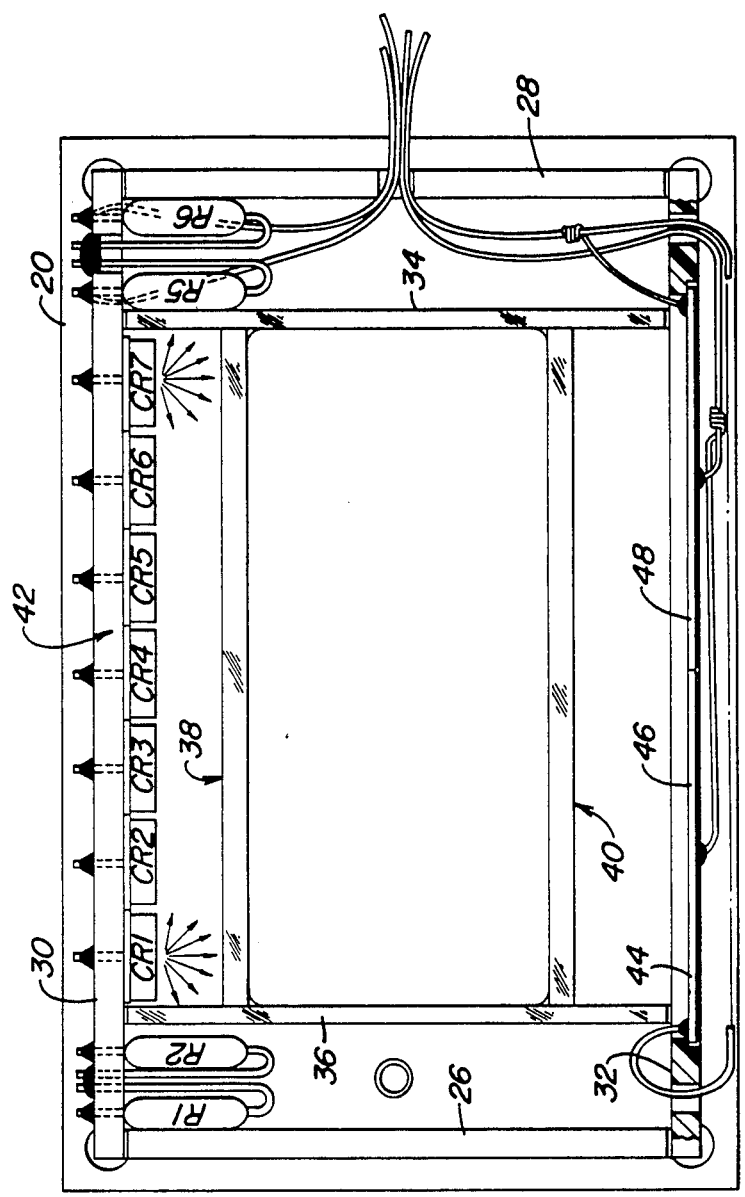
FIG. 2 is a partial sectional view taken along lines 2—2 of FIG. 1, with parts removed for clarity.
Figure 3:
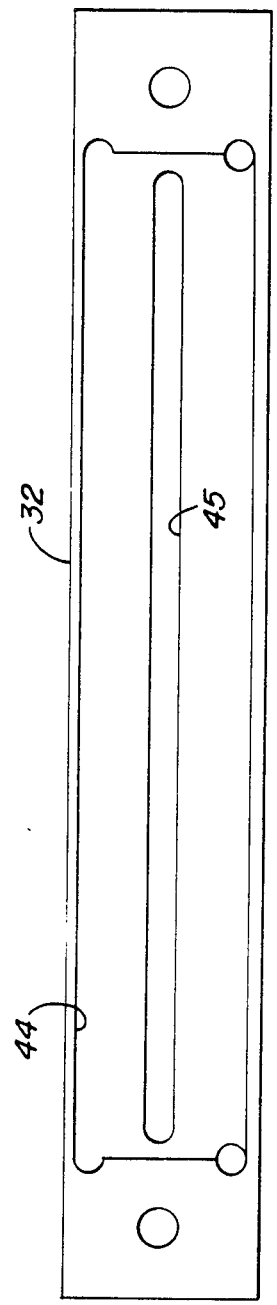
FIG. 3 is a view of the photo diode mounting plate looking towards the LED array with the photo diodes removed.

As best seen in FIG. 2, this array of LEDs extends substantially across the entire length of the seed flow path 14 and transversely to the direction of seed flow which is downwards, viewing FIG. 1. The radiation beam generated by each LED has a wide angular dispersion approaching that of a point light source mounted on a planar surface. Thus, the beams from adjacent pairs of the LEDs intersect with each other well before they reach the nearest window 38. This assures that all areas in the seed flow path between windows 38 and 40 are illuminated.

The end plate 32 is preferably made of opaque black plastic and has a rectangular recess 44 which receives a pair of flat planar detectors or photo diodes 46 and 48 for generating electrical signals in linear response to radiation received thereby. End plate 32 also includes a longitudinal slot or aperture 45, which has a width which is smaller than a typical dimension of the articles or seeds being sensed, (preferably 1 mm wide). Thus, slot 45 permits only a portion of the radiation from LED array 42 to impinge upon detectors 46 and 48. The slot 45 reduces the amount of ambient radiation (other than from array 42) which impinges upon detectors 46, 48. Slot 39 in window 38 narrows the angular spread of beam B to prevent the beam from reflecting off of articles or seeds which are outside of a small portion of the volume surrounded by mirrors 34 and 36 and windows 38 and 40.

Any detector which is responsive to the radiation generated by array 42 is suitable; however, in the case where infrared LEDs are used, then photo diodes, such as Type No. SP-652S made by Centronic, Inc., or the equivalent, are preferred. The end plate 32 and photo diodes 46 and 48 are positioned parallel to and spaced apart from the array 42 so that seeds traveling through seed passage 14 must pass between the array 42 and the photo diodes 46 and 48, thus varying the amount of radiation received thereby. The photo diodes 46 and 48 thus form a planar radiation detector which extends transversely with respect to the seed flow path across the longer dimension of the rectangular openings 22 and 24.

The radiation reflecting mirrors 34 and 36 are positioned parallel to each other on opposite sides of the seed flow path. Each mirror extends from an edge of side plate 30 to an edge of side plate 32. The mirrors 34 and 36 are preferably silvered or reflectively coated on the sides facing away from the seed flow path so that the reflective coatings will not be damaged due to abrasive contact with seeds.

Viewing FIG. 2, radiation from LEDs CR1 to CR7 which would otherwise be directed out of the path traversed by the seeds is reflected back into the seed path by mirrors 34 and 36. This has an effect similar to having the array 42 extend laterally beyond the plane of mirrors 34 and 36. The array 42 and the mirrors 34 and 36 cooperate to form a substantially diffuse, uniform and essentially extended radiation beam which enables the present detector to, in essense, "look behind" one seed to sense a seed which would otherwise be in the shadow of a seed which is closer to array 42.

Figure 4:
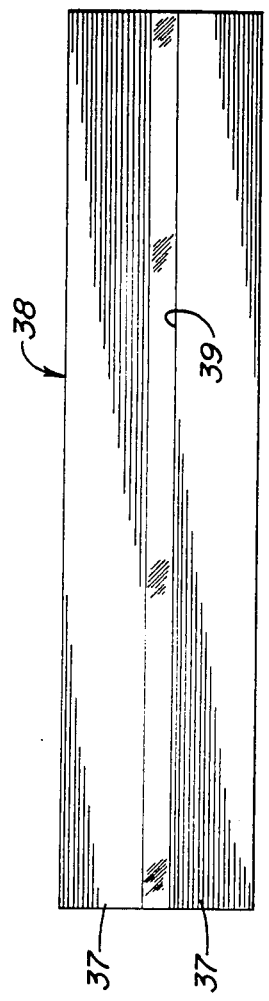
FIG. 4 is a side view of one of the radiation transmitting windows of the sensor of FIG. 1.

The glass window 38 is spaced apart from and parallel with respect to the LED array 42 and is transparent to the infrared radiation emitted thereby and has its inward facing surface in line with an inner wall 50 of the conduit 12. The window 38 extends from mirror 34 to mirror 36. As best seen in FIGS. 1 and 4, window 38 has an opaque coating or mask 37 on the side nearest the LED array 42. A longitudinal gap 39 in the mask 37 forms a slit aperture, preferably around 1 mm wide, through which the radiation from array 42 is transmitted. The gap 39 extends the full length of window 38 between mirrors 34 and 36.

The window 40 is positioned parallel to the window 38 on the opposite side of the seed flow passage 14. The transparent glass window 40 has a radiation-blocking opaque mask 41 on the side facing away from seed passage 14. A longitudinal gap 43 in the mask 41 forms a slit aperture, preferably around 2 mm wide, through which the radiation from LED array 42 is transmitted. The gap 43 also extends the full length of window 40 between mirror 34 and 36.

Figure 5:
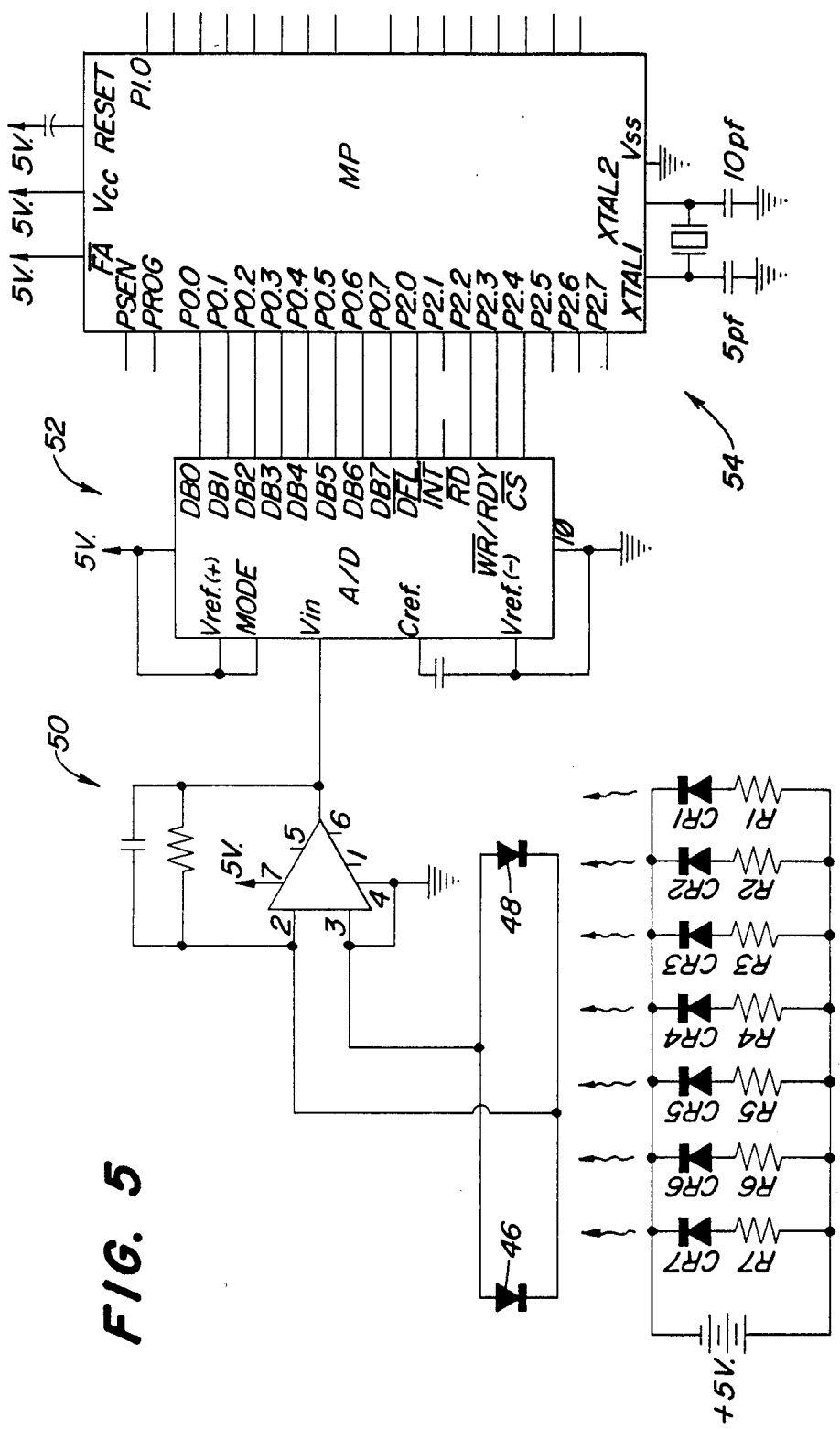
FIG. 5 is an electrical schematic of the signal processing unit according to the present invention.

As best seen in FIG. 5, each of LEDs CR1-CR7 is connected in series with a corresponding resistor R1-R7 and the resistor/LED pairs are then connected in parallel to a +5 volt power supply. The two detectors 46 and 48 are electrically connected in parallel. As best seen in FIG. 2, the resistors R1-R7 may be located in the spaces between mirrors 34 and 36 and end plates 28 and 26. The current signal from detectors 46 and 48 is received by a current-to-voltage amplifier 50. Preferably, amplifier 50 includes an operational amplifier (such as an RCA No. CA 3160), a 44 pf feedback capacitor C1 and a 562 kOhm feedback resistor. Amplifier 50 provides an analog voltage to the Vin input of conventional analog-to-digital converter 52 (such as a National Semiconductor ADC 0820). A/D converter 52 provides an 8-bit digital signal (representing the voltage at Vin) to the P0.0 to P0.7 inputs of microprocessor (micro) 54 (such as an Intel 8051). The A/D converter 52 starts an A-to-D conversion in response to a flag signal received at its WR/RDY input.

The micro 54 is supplied with a 12 MHz frequency from crystal oscillator 56. This frequency is divided internally to provide a 1 mHz machine instruction frequency. A timer (not shown), which is internal to the micro 54, counts the machine cycle frequency and generates a flag signal every 100 micro-seconds.

The micro 54 causes a new A/D conversion to be performed by converter 52 and executes an algorithm or instruction set every 100 micro-seconds in response to the occurrence of the flag signal.

Figure 6:
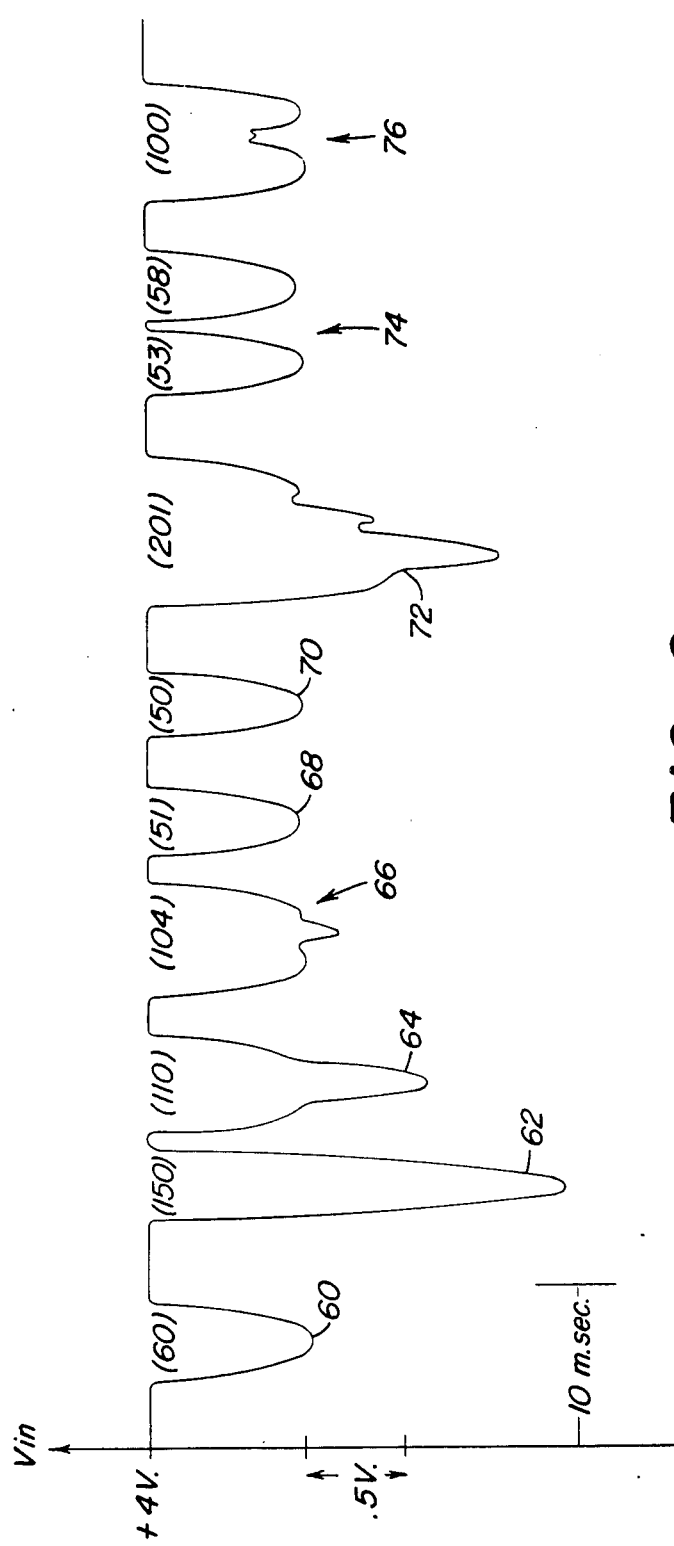
FIG. 6 is a signal timing diagram illustrative of signals which can be produced by transit of seeds through the sensor of FIGS. 1-4.
Figure 7A:
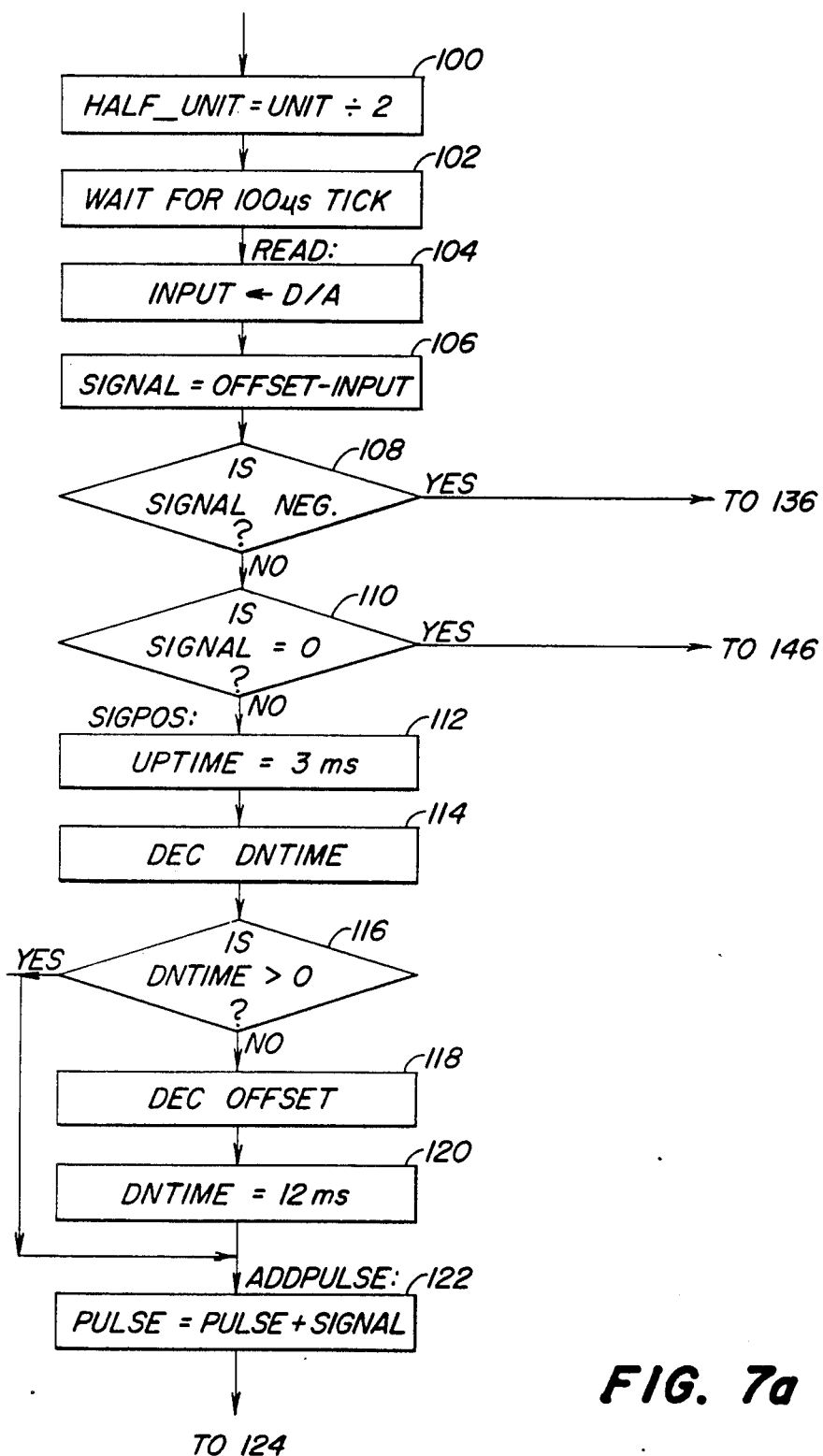
FIGS. 7a-7e contain a logic flow diagram of the signal processing algorithm executed by the signal processing unit of FIG. 5.
Figure 7B:
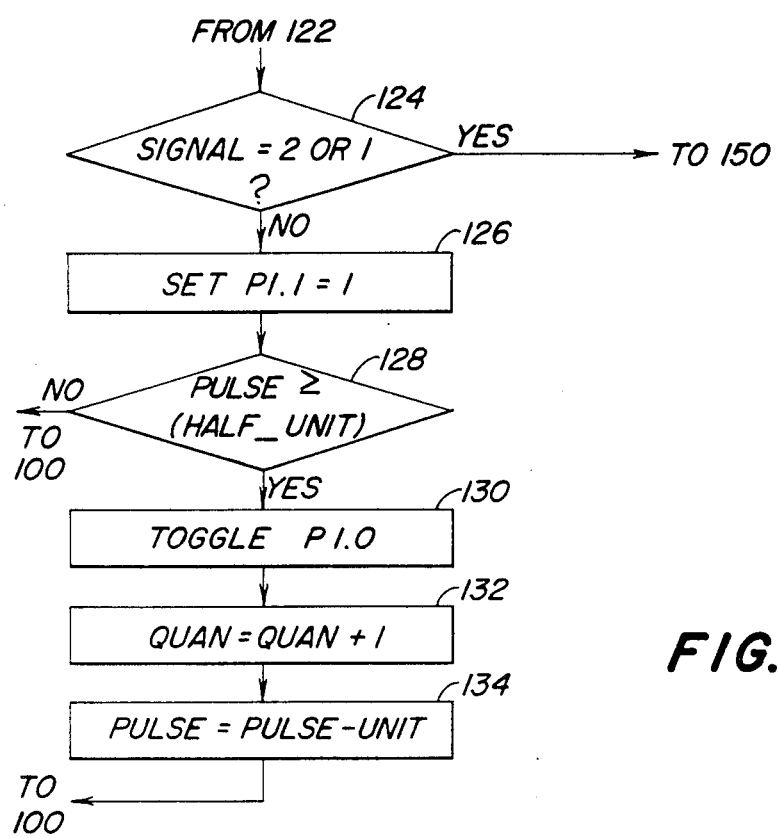
Figure 7C:
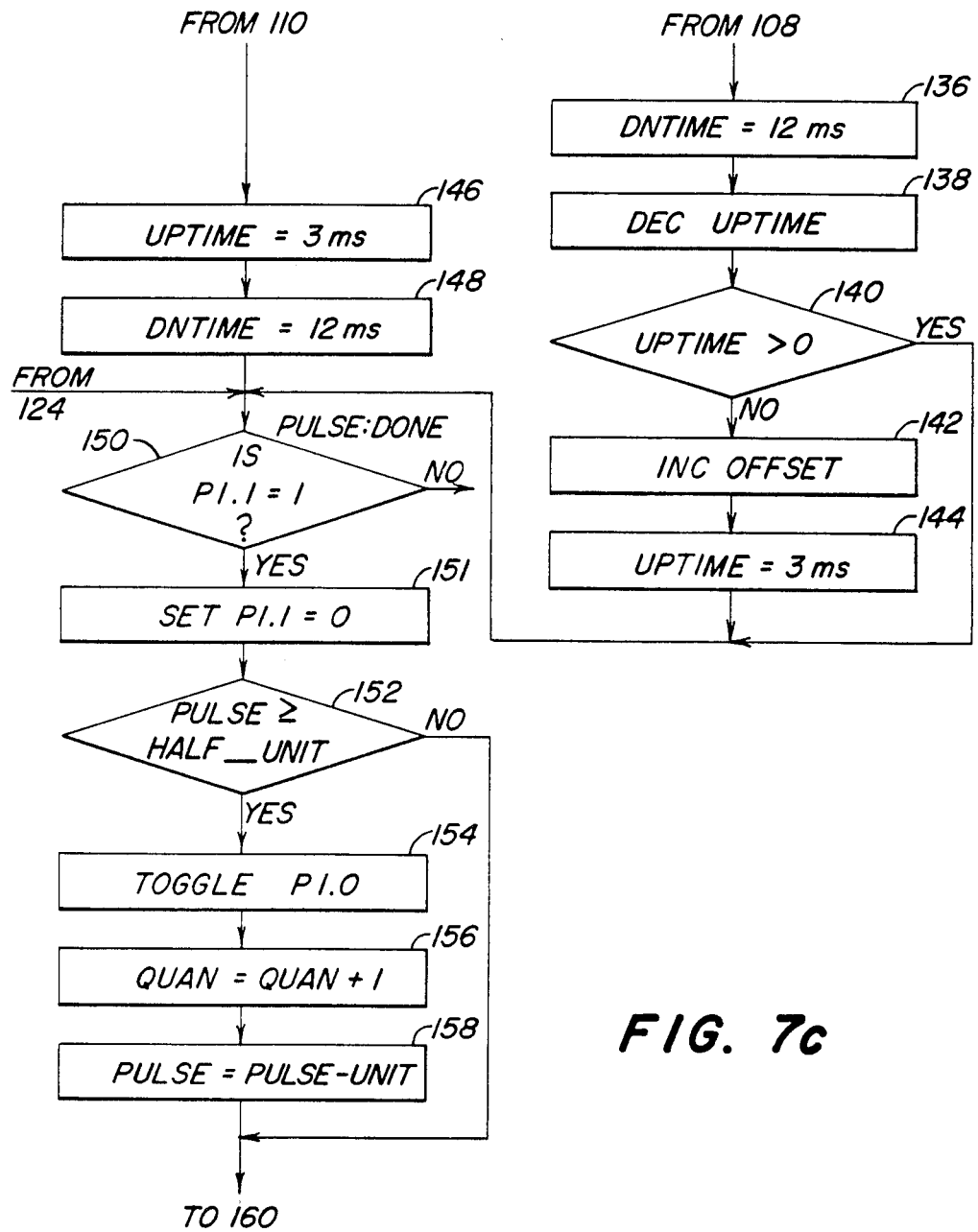
Figure 7D:
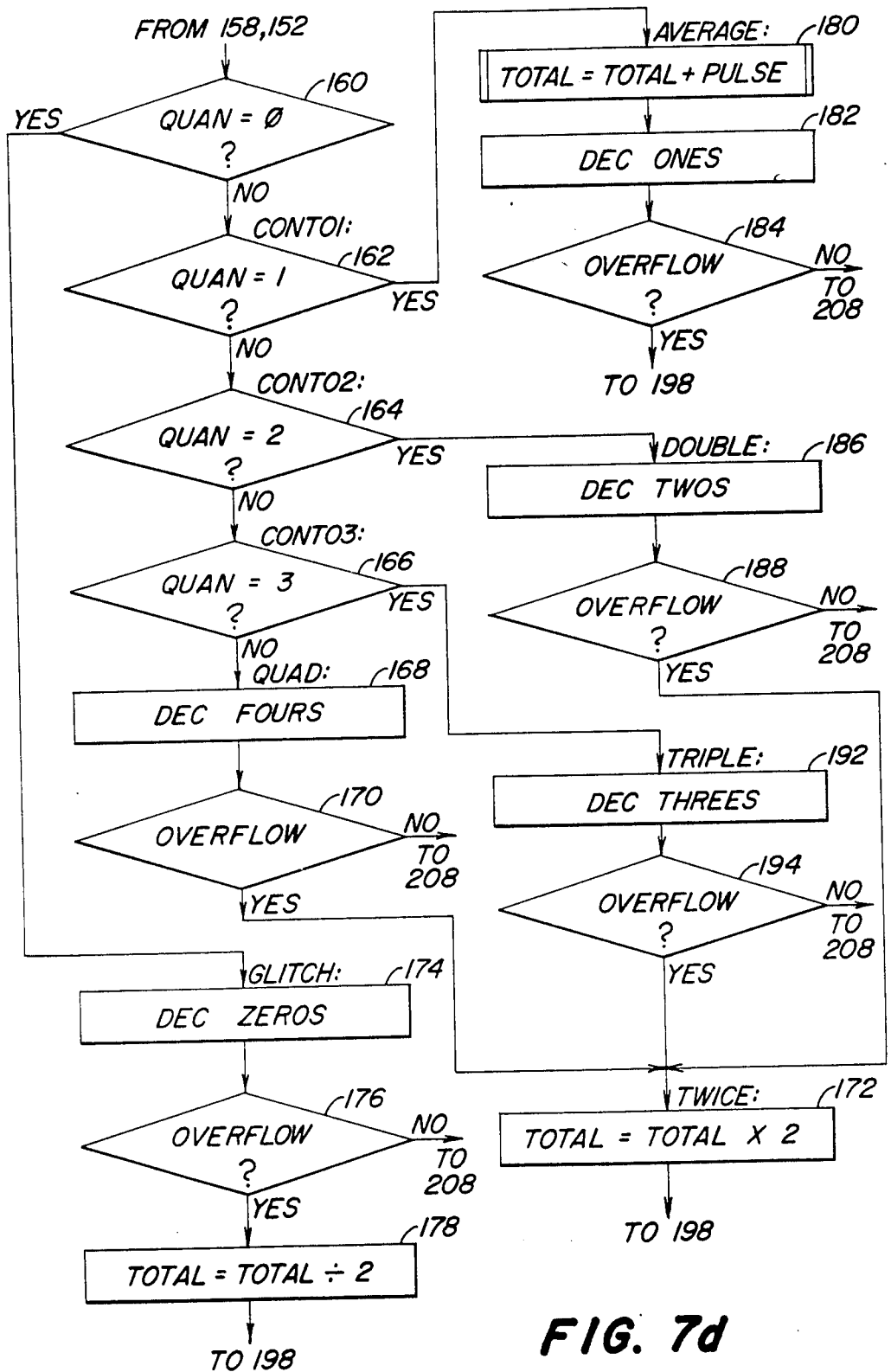
Figure 7E:
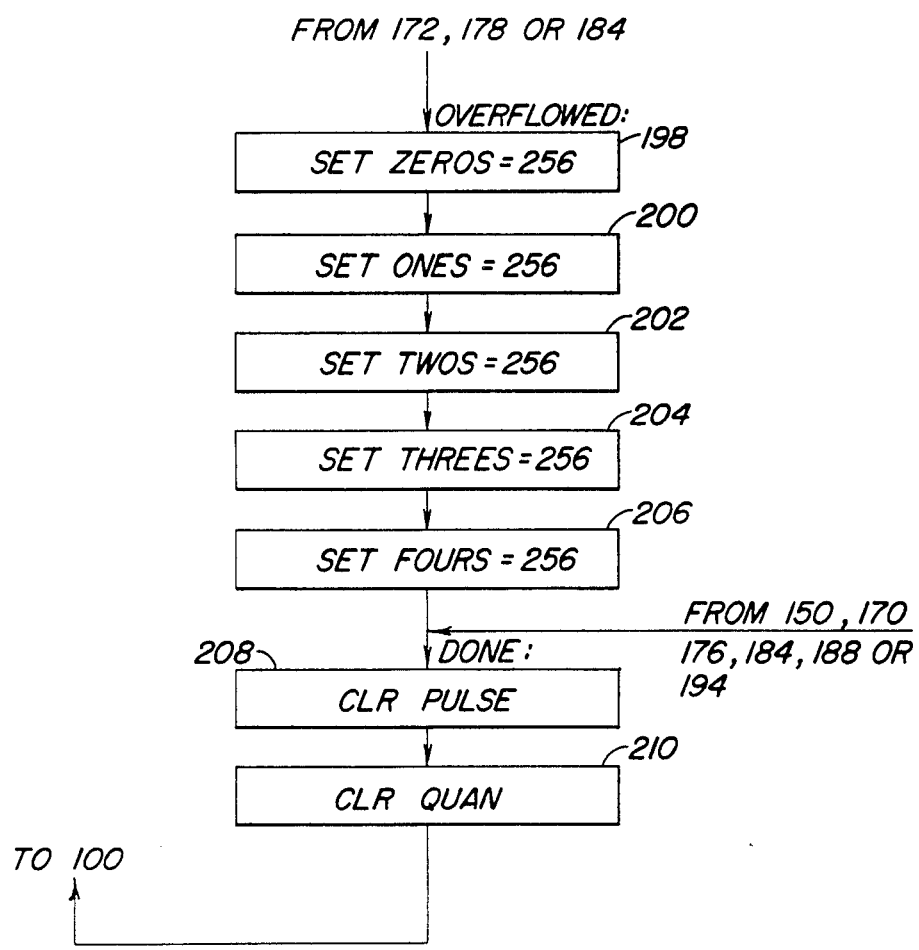

The algorithm or program executed by micro 54 is best understood with reference to the signal timing diagrams of FIG. 6 and to the logic flow diagrams of FIGS. 7a-7e.

Turning first to FIG. 6, the upper waveform is typical of an oscilloscope trace of the voltage at the Vin of A/D converter 52 when articles such as ball bearings are passed through the detector 10. The signal pulses at 60, 68 and 70 are representative of the signal produced by a single article passing through the detector 10. The signal pulses at 64, 66, 74 and 76 are representative of 2 articles passing through the detector 10. Pulse 74 is produced when the 2 articles pass sequentially, one immediately following the other. Pulse 64 is produced when the second article enters the radiation beam before the first article leaves it. Pulses 64 and 66 represent situations where 2 articles pass through the detector nearly simultaneously, or in very close proximity to each other, regardless of the orientation of the article grouping. Pulse 62 is produced by 3 articles passing nearly simultaneously through the detector 10. Pulse 72 is produced by 4 articles passing nearly simultaneously through the detector 10. The paranthetical numbers inside the waveform pulses are proportional to the area circumscribed by the pulses in arbitrary units. These waveforms illustrate that the area circumscribed by each is related to the number of articles which produce the waveform.

It should be noted that a differentiating-type counter would probably incorrectly interpret pulses 62, 64, 66 and 72 as being produced by 1, 1, 2 or 3, and 3 articles, respectively, whereas, these pulses are actually caused by groups of 3, 2, 2 and 4 articles, respectively. The following signal-processing algorithm correctly interprets these pulses as being caused by article counts of 3, 2, 2 and 4, respectively.

Turning now to FIGS. 7a–7e, the algorithm begins at step 100 by setting a HALF_UNIT value equal to ½ of a UNIT value which is initially equal to 768 to represent an initial estimate of the typical area circumscribed by the signal pulse produced by passage of a single article through the sensor apparatus. Such a pulse is shown at 60 of FIG. 6. Then, step 102 causes the algorithm to pause until the internal timer generates a flag signal at 100 micro-second intervals. Upon generation of the flag signal, step 104 causes A/D converter 52 to perform a conversion and input a new digital Vin value (INPUT) into the micro 54. Then, in step 106, a SIGNAL value is set equal to OFFSET-INPUT, where OFFSET represents the possibly slowly varying steady-state level of Vin (normally 4 volts) when no seeds are interrupting the beam B. Thus, when a seed is in the beam B, the SIGNAL value will normally be positive and will represent the vertical depth of the Vin signal (see FIG. 6) at each sampling instant relative to the normal or steady-state value of Vin when no seed is in the beam B.

However, the SIGNAL may be negative if no seed is present and if the OFFSET value is lower than the current steady state Vin level. In this case, step 108 directs the algorithm to steps 136–144. In step 136, an DNTIME timer is initialized to a value representing a 12 msec interval. Step 138 decrements an UPTIME timer. Step 140 routes the algorithm to step 150 if the UPTIME timer has not counted out; otherwise, in step 142, the OFFSET value is incremented by 1 binary count. Finally, step 144 sets the UPTIME timer to a 3 msec value. Thus, the OFFSET value will be incremented if the SIGNAL value remains negative for more than 3 msec.

If SIGNAL is not negative, then step 108 directs the algorithm to step 110 which determines if SIGNAL=0. If yes, it means that no seed is present and that the current OFFSET value appears proper and steps 146 and 148 set the UPTIME and DNTIME timers to values representing 3 milliseconds and 12 milliseconds, respectively. If no, then it means it is possible that a seed or seeds are in the beam B.

In step 112, the UPTIME timer is set to a 3 millisecond value. The DNTIME timer is decremented in step 114. Then, step 116 determines if the DNTIME timer value is greater than zero. If no, it means that SIGNAL has been positive for 12 milliseconds and the OFFSET value is adjusted by 1 digital count in step 118, and the DNTIME timer is again set to a value representing 12 milliseconds. If in step 116 the DNTIME counter is greater than zero (which means that SIGNAL has been positive for less than 12 milliseconds), or after step 120, the algorithm proceeds to step 122.

In step 122, a PULSE value (initially zero), is numerically integrated by adding to its previous value the current SIGNAL value. Thus, the PULSE value represents an area circumscribed by the graphical representation of the Vin signal pulses shown in FIG. 6.

Step 124 determines whether SIGNAL equals a digital count of 2 or 1. If not, it means that SIGNAL must be greater than 2 since steps 108 and 110 have already determined that SIGNAL is non-negative and non-zero. In this case, it means that a seed or seed group has begun or remains in transit through the beam B and the algorithm proceeds to step 126 where a P1.1 flag (initially zero) is set equal to 1. Then, step 128 determines whether the area value PULSE is greater than or equal to the HALF_UNIT value (which represents 50% of the typical area of the signal pulse produced by transit of a single seed.) If PULSE has not attained this 50% area value, then the algorithm returns to step 100 for updating of the SIGNAL value in step 106 and further integration of the PULSE value in step 122. However, if PULSE exceeds the 50% area value, then step 130 causes the signal at micro output port P1.0 to toggle to indicate transit of a seed through the sensor. Next, step 132 increments a QUAN value (initially zero) which represents the total number of seeds in seed group which may be passing through the sensor. Then, step 134 sets the area value, PULSE, equal to (PULSE-UNIT) and returns the algorithm to step 100. This makes the PULSE value negative so the condition of step 128 will again be met only upon additional repetitive integration of the PULSE value by step 122 due to transit of a further seed or seeds of a seed group.

Referring back to step 124, if the SIGNAL value has a digital value of 2 or 1, it is interpreted to mean that the passage of a seed or a seed group through the beam B has just begun or has just been completed (or that noise or negative drift of the bias level has occurred) and the algorithm proceeds to step 150 and further integration of the PULSE value is prevented. Step 150 determines if a P1.1 flag value (initially zero) is equal to 1. If P1.1 does not equal 1, then it means either that step 126 has not yet been executed because there convincing evidence (i.e., SIGNAL>2) that a seed is in transit and that P1.1 was previously cleared to zero at step 151 when the last seed transit was finished. In this case, the algorithm is directed to steps 208–212 wherein the PULSE and QUAN values are cleared and the algorithm is returned to step 100. If, on the other hand, the P1.1 value equals 1 in step 150, then it means a seed transit is just ending and the algorithm is directed to step 151 where P1.1 is cleared.

In step 152, the area value PULSE is compared to the HALF_UNIT area value. If PULSE is less than HALF_UNIT, then the algorithm proceeds to step 160. However, if PULSE is not less than HALF_UNIT, then step 154 causes the micro output port P1.0 to toggle (as at step 130) to indicate transit of a seed through the sensor. Then, the total seed number value, QUAN, is incremented in step 156, and the PULSE value is reset to a negative value in step 158 (as in step 134).

At this point, it is helpful to understand how the value, PULSE, varies as a single seed passes through the beam B. Initially, the PULSE value will be zero. Then, as a seed transit produces a waveform, such as 60 of FIG. 6, the PULSE value will be repetitively integrated by the addition of the increasing SIGNAL values in step 122 until PULSE equals the HALF_UNIT value, at which time, the Vin level reaches a minimum and the SIGNAL value reaches a maximum. Then, step 128 operates to direct the algorithm through steps 130–134, wherein step 134 resets the PULSE value to a negative value, typically equal to —(HALF_UNIT), if the UNIT value accurately represents the area circumscribed by the waveform pulse being processed. Then, during the remainder or second half of waveform 60, step 122 integrates the PULSE value back up so that when Vin returns to its steady state value and when SIGNAL reaches zero, the PULSE value will return to zero, again assuming that the UNIT value was an accurate estimate of the total area of pulse waveform 60.

Now, if, in fact, the estimated area value UNIT, was too large, then at the end of a seed transit, the PULSE value in step 122 will be slightly negative. Thus, as described later in detail, this slightly negative PULSE value will be utilized in algorithm portion 180 to slightly reduce the TOTAL value. Since the TOTAL value is stored as a 3-byte value (each byte consisting of 8 bits) and since, by definition, the UNIT value is that which is stored in the 2 most significant bytes of TOTAL, therefore, a reduction in the TOTAL value also reduces the UNIT value, thus making the UNIT value more closely approximate the typical or average signal pulse area produced by a single seed transit. Similarly, if the estimated area value, UNIT, was too small, then the PULSE value in step 122 (at the end of pulse area integration) will be slightly positive. This will cause the algorithm portion 180 to slightly increase the TOTAL value, and will cause a corresponding increase in the UNIT value for use during the next seed transit. Thus, by adjusting the TOTAL and UNIT values, the algorithm automatically compensates for changes in the average size of seeds passing through the sensor.

Steps 160-210 will now be described. To summarize, steps 160-210 operate to make major adjustments (if ever needed) in the estimated signal pulse area value, UNIT, so that the correct values of UNIT and HALF_UNIT will be utilized in steps 100, 128, 134, 152 and 158.

Steps 160-166 determine whether the QUAN value (initially zero or set in steps 132 or 156) equals 0, 1, 2, 3 or more (representing signal pulses caused by the transit of something less than a seed (QUAN=0) or by the transit of seed groups consisting of 1, 2, 3 or more seeds, respectively).

Under normal conditions, the signal pulse which is produced most often will be that which is caused by the transit of a single article or seed through the beam B, thus QUAN will most often be equal to 1 (assuming a reasonably accurate UNIT value). In this case, step 162 will route the algorithm to a portion of the algorithm represented by 180 which has the effect of deriving an updated TOTAL value equal to the sum of the current TOTAL and residual PULSE values. Since, as previously described, the TOTAL value is related to the UNIT value, this, in effect, repetitively adjusts the UNIT value so that it continues to represent the signal pulse area caused by transit of a single seed. Then, step 182 decrements a ONES counter (initially 256 or reset to 256, at step 200). If the ONES counter is decremented to zero, then step 184 recognizes this overflow condition and routes the algorithm to steps 198-210 which reset the ZEROES, ONES, TWOS, THREES and FOURS counters to 256 and which clear to zero the PULSE and QUAN values so that they can be redetermined by steps 100-158. If the ONES counter has not overflowed, then the algorithm is directed by step 184 directly to steps 208 and 210. Thus, if the UNIT value accurately represents the estimated single seed pulse area, the algorithm will most often incrementally adjust the UNIT value (via adjustment of the TOTAL value in 180), and will continuously reset the ZEROS, TWOS, THREES and FOURS counters in steps 198, 202, 204 and 206 so that the algorithm will never execute step 178 or step 172 which either divides TOTAL by 2 or multiplies TOTAL by 2.

However, if the UNIT value is too large, then the QUAN value will most often be zero because steps 128 and 152 would prevent incrementing of the QUAN value in steps 132 or 156. In this case, the algorithm will most often be directed by step 160 to step 174 which decrements the ZEROES counter. If this situation persists, then step 174 will eventually decrement the ZEROS counter to zero, whereupon step 176 will recognize this overflow condition and will route the algorithm to step 178. Step 178 reduces the TOTAL value by 50% (for example) and thus, causes a corresponding reduction in the UNIT value. Eventually, this process will reduce the UNIT value to a level whereby single seed transits will produce QUAN values equal to 1.

If the estimated pulse area value, UNIT, is too low, then the most often occurring single seed transits can result in QUAN values of 2, 3 or more. In this case, steps 164 and 166 will route the algorithm to steps 186, 192 or 194 where TWOS, THREES and FOURS counters (initially 256 or reset to 256 in steps 202-206) are decremented. When any of these counters reaches zero, then steps 188, 194 or 170 will recognize the overflow condition and will route the algorithm to step 172. Step 172 multiplies the TOTAL value by 2, thus causing an increase in the estimated area value, UNIT. Otherwise, steps 188, 192 and 170 will route the algorithm directly to steps 208 and 210 and thence, back to step 100.

It has been found that it is adequate merely to double the TOTAL value (such as in step 172) regardless of which of the TWOS, THREES or FOURS counters overflows first. However, it would be possible to change the TOTAL value by different amounts, depending upon which counter overflowed first by adding separate TOTAL recalculating steps after each of steps 188, 194 and 170.

Another alternative would be to route the "NO" branch from step 162 directly to step 186 (eliminating steps 164-170, and steps 192-194) and to make the initial and reset value of the ONES counter smaller than that of TWOS counter so that under normal circumstances, the ONES counter will continue to overflow before the TWOS counter (which, in this case, would be decremented upon the transit of any seed group producing a QUAN value of 2 or more.)

At the end of this "Detailed Description" are object and source code listings of the computer program which is illustrated by the logic flow chart of FIGS. 7a-7e. The source code listing includes labels such as READ: and ADDPULSE:, which corresponds to similar labels in the flow chart. There also follows a cross-reference symbol table listing which includes various acronyms used in the flow chart and program listing.

While the invention has been described in conjunction with a specific embodiment, it is to be understood that many alternatives, modifications and variations will be apparent to those skilled in the art in light of the aforegoing description. For example, the signal-processing algorithm described herein could be used in conjunction with another type of article or seed sensor as long as the sensor can generate a signal which varies substantially linearly with the number of articles or seeds within it. Accordingly, this invention is intended to embrace all such alternatives, modifications and variations which fall within the spirit and scope of the appended claims.

MCS-51 MACRO ASSEMBLER    SEED21

ISIS-II MCS-51 MACRO ASSEMBLER V2.1
OBJECT MODULE PLACED IN :F1:SEED21.OBJ
ASSEMBLER INVOKED BY:   ASM51 :F1:SEED21.A51

```
LOC  OBJ          LINE    SOURCE
                    1     $ XREF PAGELENGTH(62) DEBUG ERRORPRINT NOMACRO
                    2
                    3     ; THIS PROGRAM WAS LAST EDITED AT 5:16 PM ON APRIL 20, 1984.
                    4     ; WRITTEN BY KENNETH FRIEND
                    5
                    6     ; THIS PROGRAM WILL RUN THE 8051 MICROCOMPUTER USED IN THE PLANTER SEED SENSOR.
                    7
                    8
001E                9     THREE_MILLISECONDS EQU 3*10
0078               10     TWELEVE_MILLISECONDS EQU 12*10
                   11
  REG              12     UPTIME          EQU     R0
  REG              13     DNTIME          EQU     R1
  REG              14     QUAN            EQU     R2
  REG              15     PULSE_HI        EQU     R3
  REG              16     PULSE_LO        EQU     R4
  REG              17     TOTAL_HI        EQU     R5
  REG              18     TOTAL_MI        EQU     R6
  REG              19     TOTAL_LO        EQU     R7
  REG              20     UNIT_HI         EQU     TOTAL_HI
  REG              21     UNIT_LO         EQU     TOTAL_MI
                   22
----               23             DSEG    AT      30H
0030               24     TEMP:           DS      1
0031               25     OFFSET:         DS      1
0032               26     SIGNAL:         DS      1
0033               27     HALF_UNIT_HI:   DS      1
0034               28     HALF_UNIT_LO:   DS      1
0035               29     ZEROS:          DS      1
0036               30     ONES:           DS      1
0037               31     TWOS:           DS      1
0038               32     THREES:         DS      1
0039               33     FOURS:          DS      1
003A               34     GLITCHES:       DS      2
  003A             35     GLITCHES_HI     DATA    GLITCHES
  003B             36     GLITCHES_LO     DATA    GLITCHES+1
003C               37     SINGLES:        DS      2
  003C             38     SINGLES_HI      DATA    SINGLES
  003D             39     SINGLES_LO      DATA    SINGLES+1
003E               40     DOUBLES:        DS      2
  003E             41     DOUBLES_HI      DATA    DOUBLES
  003F             42     DOUBLES_LO      DATA    DOUBLES+1
0040               43     TRIPLES:        DS      2
  0040             44     TRIPLES_HI      DATA    TRIPLES
  0041             45     TRIPLES_LO      DATA    TRIPLES+1
0042               46     QUADRUPLES:     DS      2
  0042             47     QUADRUPLES_HI   DATA    QUADRUPLES
  0043             48     QUADRUPLES_LO   DATA    QUADRUPLES+1
                   49
                   50     SEJECT
                   51             CSEG    AT      000H
                   52
0000 2100          53             AJMP    START
                   54
0100               55             ORG     100H
0100 E4            56     START:  CLR     A                       ; \
0101 787F          57             MOV     R0,#7FH                 ; : CLEAR RAM
0103 F6            58     LOOP:   MOV     @R0,A                   ; :
0104 D8FD          59             DJNZ    R0,LOOP                 ; /
                   60
0106 0D            61             INC     UNIT_HI                 ; INITIALIZE UNIT_DB TO 0100H
                   62
0107 758C9C        63             MOV     TH0,#256-100            ; \
010A 7589BA        64             MOV     TMOD,#10111010B         ; : SET UP TIMER TO SET TF0 EVERY 100 MICROSECONDS
010D D28C          65             SETB    TR0                     ; /
                   66
                   67     INITIALIZE:
010F 7D03          68             MOV     UNIT_MI,#03H            ; INITIALIZE FOR THE APPROXIMATE SIZE OF A SOYBEAN
0111 D2A3          69             SETB    P2.3                    ; START A/D CONVERSION
0113 781E          70             MOV     UPTIME,#THREE_MILLISECONDS
0115 7978          71             MOV     DNTIME,#TWELEVE_MILLISECONDS
0117 858031        72             MOV     OFFSET,P0               ; INITIALIZE OFFSET
                   73
                   74     ;****************************************************************************************
                   75     ;* START OF MAIN LOOP                                                                    *
                   76     ;*    EXECUTES AT EVERY 100 MICROSECOND TICK FROM THE TIMER.                             *
                   77     ;****************************************************************************************
                   78     MAIN_LOOP:      ; THIS IS THE START OF THE MAIN LOOP.
011A C3            79             CLR     C                       ; \
011B ED            80             MOV     A,UNIT_HI               ; :
011C 13            81             RRC     A                       ; :
011D F533          82             MOV     HALF_UNIT_HI,A          ; : HALF_UNIT_DB <- (UNIT_DB / 2)
011F EE            83             MOV     A,UNIT_LO               ; :
0120 13            84             RRC     A                       ; :
0121 F534          85             MOV     HALF_UNIT_LO,A          ; /
                   86
0123 308DFD        87     WAIT:   JNB     TF0,WAIT                ; \ WAIT HERE TILL 100 MICROSECOND TICK
0126 C28D          88             CLR     TF0                     ; /
                   89
0128 C2A2          90     READ:   CLR     P2.2                    ; ASSURANCE THAT "NOT READ" LINE IS LOW
012A C2A4          91             CLR     P2.4                    ; ASSURANCE THAT CHIP SELECT LINE IS LOW
012C C2A3          92             CLR     P2.3                    ; \ PULSE LOW THE "NOT WRITE" LINE TO START CONVERSION
012E D2A3          93             SETB    P2.3                    ; /
0130 C3            94             CLR     C                       ; \
0131 E531          95             MOV     A,OFFSET                ; : SIGNAL <- OFFSET - INPUT
0133 9580          96             SUBB    A,P0                    ; :
0135 F532          97             MOV     SIGNAL,A                ; /
                   98
0137 403C          99             JC      SIG_NEG                 ; JUMP IF SIGNAL IS NEGATIVE
0139 6034         100             JZ      SIG_ZERO                ; JUMP IS SIGNAL IS ZERO
                  101
                  102     SIG_POS:
013B 781E        103             MOV     UPTIME,#THREE_MILLISECONDS
013D D904        104             DJNZ    DNTIME,ADDPULSE         ; JUMP AROUND IF NO CHANGE IN OFFSET NEEDED
013F 1531        105             DEC     OFFSET
0141 7978        106             MOV     DNTIME,#TWELEVE_MILLISECONDS
                  107     ADDPULSE:
0143 EC          108             MOV     A,PULSE_LO              ; \
0144 2532        109             ADD     A,SIGNAL                ; :
```

```
0146 FC           110              MOV    PULSE_LO,A      ; :
0147 E4           111              CLR    A               ; : PULSE_DB <- PULSE_DB + SIGNAL
0148 3B           112              ADDC   A,PULSE_HI      ; :
0149 FB           113              MOV    PULSE_HI,A      ; /
                  114
014A D53202       115              DJNZ   SIGNAL,NOT_1    ; \
014D 217D         116              AJMP   PULSE_DONE      ; : JUMP TO PULSE_DONE IF SIGNAL .EQ. (1 .OR. 2)
014F D53202       117     NOT_1:   DJNZ   SIGNAL,NOT_1_OR_2 ;
0152 217D         118              AJMP   PULSE_DONE      ; /
                  119
                  120     NOT_1_OR_2: ; TO GET TO THIS POINT A SEED PULSE IS PROBABLY OCCURING.
0154 D291         121              SETB   P1.1            ; SET FLAG TO INDICATE SEED DETECTION STARTED
0156 EB           122              MOV    A,PULSE_HI      ; \
0157 20E7C0       123              JB     ACC.7,MAIN_LOOP ; :
015A C3           124              CLR    C               ; :
015B EC           125              MOV    A,PULSE_LO      ; : JUMP TO MAIN_LOOP IF PULSE_DB .LT. (UNIT_DB / 2)
015C 9534         126              SUBB   A,HALF_UNIT_LO  ; :
015E EB           127              MOV    A,PULSE_HI      ; :
015F 9533         128              SUBB   A,HALF_UNIT_HI  ; :
0161 40B7         129              JC     MAIN_LOOP       ; /
0163 B290         130              CPL    P1.0            ; OUTPUT 1 EDGE TO INDICATE 1 SEED SENSED
0165 0A           131              INC    QUAN
0166 A3           132              INC    DPTR            ; DEBUG
0167 EC           133              MOV    A,PULSE_LO      ; \
0168 9E           134              SUBB   A,UNIT_LO       ; :
0169 FC           135              MOV    PULSE_LO,A      ; : PULSE_DB <- PULSE_DB - UNIT_DB
016A EB           136              MOV    A,PULSE_HI      ; :
016B 9D           137              SUBB   A,UNIT_HI       ; :
016C FB           138              MOV    PULSE_HI,A      ; /
016D 211A         139              AJMP   MAIN_LOOP
                  140
                  141     SIG_ZERO:
016F 781E         142              MOV    UPTIME,#THREE_MILLISECONDS
0171 7978         143              MOV    DNTIME,#TWELEVE_MILLISECONDS
0173 217D         144              AJMP   PULSE_DONE
                  145
                  146     SIG_NEG:
0175 7978         147              MOV    DNTIME,#TWELEVE_MILLISECONDS
0177 D804         148              DJNZ   UPTIME,PULSE_DONE
0179 0531         149              INC    OFFSET
017B 781E         150              MOV    UPTIME,#THREE_MILLISECONDS
                  151
                  152     PULSE_DONE: ; AT THIS POINT, SIGNAL IS ZERO, ONE, TWO, OR NEGATIVE (NO PULSE IS OCCURING)
017D 109102       153              JBC    P1.1,CONT       ; \ JUMP TO DONE IF NO SEED HAS STARTED
0180 411E         154              AJMP   DONE            ; /
0182 EB           155     CONT:    MOV    A,PULSE_HI      ; \
0183 20E713       156              JB     ACC.7,RECORD    ; :
0186 C3           157              CLR    C               ; :
0187 EC           158              MOV    A,PULSE_LO      ; : JUMP AROUND IF PULSE_DB .LT. (UNIT_DB / 2)
0188 9534         159              SUBB   A,HALF_UNIT_LO  ; :
018A EB           160              MOV    A,PULSE_HI      ; :
018B 9533         161              SUBB   A,HALF_UNIT_HI  ; :
018D 400A         162              JC     RECORD          ; /
018F B290         163              CPL    P1.0            ; OUTPUT 1 EDGE TO INDICATE 1 SEED SENSED
0191 0A           164              INC    QUAN
0192 A3           165              INC    DPTR            ; DEBUG
0193 EC           166              MOV    A,PULSE_LO      ; \
0194 9E           167              SUBB   A,UNIT_LO       ; :
0195 FC           168              MOV    PULSE_LO,A      ; : PULSE_DB <- PULSE_DB - UNIT_DB
0196 EB           169              MOV    A,PULSE_HI      ; :
0197 9D           170              SUBB   A,UNIT_HI       ; :
0198 FB           171              MOV    PULSE_HI,A      ; /
                  172
0199 BA001A       173     RECORD:  CJNE   QUAN,#0,CONTO1  ; JUMP IF NOT A GLITCH
019C 7401         174     GLITCH:  MOV    A,#1            ; \
019E 253B         175              ADD    A,GLITCHES_LO   ; :
01A0 F53B         176              MOV    GLITCHES_LO,A   ; : INCREMENT THE NUMBER OF GLITCHES FOUND    DEBUG
01A2 E4           177              CLR    A               ; :
01A3 353A         178              ADDC   A,GLITCHES_HI   ; :
01A5 F53A         179              MOV    GLITCHES_HI,A   ; /
01A7 D53574       180              DJNZ   ZEROS,DONE      ; JUMP IF NOT TOO MANY GLITCHES FOUND
                  181
01AA C3           182     HALVE:   CLR    C               ; \
01AB ED           183              MOV    A,TOTAL_HI      ; :
01AC 13           184              RRC    A               ; :
01AD FD           185              MOV    TOTAL_HI,A      ; :
01AE EE           186              MOV    A,TOTAL_MI      ; : TOTAL_TR <- TOTAL_TR / 2
01AF 13           187              RRC    A               ; :    UNIT_DB <- UNIT_DB / 2
01B0 FE           188              MOV    TOTAL_MI,A      ; :
01B1 EF           189              MOV    A,TOTAL_LO      ; :
01B2 13           190              RRC    A               ; :
01B3 FF           191              MOV    TOTAL_LO,A      ; /
01B4 4113         192              AJMP   OVERFLOWED
                  193
01B6 DA1F         194     CONTO1:  DJNZ   QUAN,CONTO2     ; JUMP IF NOT A SINGLE
01B8 7401         195     SINGLE:  MOV    A,#1            ; \
01BA 253D         196              ADD    A,SINGLES_LO    ; :
01BC F53D         197              MOV    SINGLES_LO,A    ; : INCREMENT THE NUMBER OF SINGLES FOUND    DEBUG
01BE E4           198              CLR    A               ; :
01BF 353C         199              ADDC   A,SINGLES_HI    ; :
01C1 F53C         200              MOV    SINGLES_HI,A    ; /
                  201     AVERAGE:
01C3 EF           202              MOV    A,TOTAL_LO      ; \
01C4 2C           203              ADD    A,PULSE_LO      ; :
01C5 FF           204              MOV    TOTAL_LO,A      ; :
01C6 EE           205              MOV    A,TOTAL_MI      ; :
01C7 3B           206              ADDC   A,PULSE_HI      ; :
01C8 FE           207              MOV    TOTAL_MI,A      ; : TOTAL_TR <- TOTAL_TR + PULSE_DB
01C9 E4           208              CLR    A               ; :
01CA 8BF0         209              MOV    B,PULSE_HI      ; :
01CC 30F701       210              JNB    B.7,AROUND      ; :
01CF F4           211              CPL    A               ; :
01D0 3D           212     AROUND:  ADDC   A,TOTAL_HI      ; :
01D1 FD           213              MOV    TOTAL_HI,A      ; /
01D2 D53649       214              DJNZ   ONES,DONE
01D5 4113         215              AJMP   OVERFLOWED      ; ENOUGH SINGLES WERE FOUND TO BE CONSIDERED LOCKED-ON
                  216
01D7 DA10         217     CONTO2:  DJNZ   QUAN,CONTO3     ; JUMP IF NOT A DOUBLE
01D9 7401         218     DOUBLE:  MOV    A,#1            ; \
01DB 253F         219              ADD    A,DOUBLES_LO    ; :
01DD F53F         220              MOV    DOUBLES_LO,A    ; : INCREMENT THE NUMBER OF DOUBLES FOUND    DEBUG
01DF E4           221              CLR    A               ; :
01E0 353E         222              ADDC   A,DOUBLES_HI    ; :
01E2 F53E         223              MOV    DOUBLES_HI,A    ; /
01E4 D53737       224              DJNZ   TWOS,DONE
01E7 4109         225              AJMP   TWICE           ; TOO MANY DOUBLES FOUND
```

```
                        226
01E9 DA10               227     CONTO3: DJNZ    QUAN,QUAD       ; JUMP IF NOT A TRIPLE
01EB 7401               228     TRIPLE: MOV     A,#1            ; \
01ED 2541               229             ADD     A,TRIPLES_LO    ; :
01EF F541               230             MOV     TRIPLES_LO,A    ; : INCREMENT THE NUMBER OF TRIPLES FOUND        DEBUG
01F1 E4                 231             CLR     A               ; :
01F2 3540               232             ADDC    A,TRIPLES_HI    ; :
01F4 F540               233             MOV     TRIPLES_HI,A    ; /
01F6 D53825             234             DJNZ    THREES,DONE
01F9 21D9               235             AJMP    DOUBLE          ; TOO MANY TRIPLES FOUND
                        236
01FB 7401               237     QUAD:   MOV     A,#1            ; \
01FD 2543               238             ADD     A,QUADRUPLES_LO ; :
01FF F543               239             MOV     QUADRUPLES_LO,A ; : INCREMENT THE NUMBER OF QUADRUPLES FOUND    DEBUG
0201 E4                 240             CLR     A               ; :
0202 3542               241             ADDC    A,QUADRUPLES_HI ; :
0204 F542               242             MOV     QUADRUPLES_HI,A ; /
0206 D53915             243             DJNZ    FOURS,DONE      ; JUMP IF TOO MANY QUADRUPLES AND ABOVE FOUND
                        244
0209 C3                 245     TWICE:  CLR     C               ; \
020A EF                 246             MOV     A,TOTAL_LO      ; :
020B 33                 247             RLC     A               ; :
020C FF                 248             MOV     TOTAL_LO,A      ; :
020D EE                 249             MOV     A,TOTAL_MI      ; : TOTAL_TR <- TOTAL_TR * 2
020E 33                 250             RLC     A               ; :  UNIT_DB <- UNIT_DB * 2
020F FE                 251             MOV     TOTAL_MI,A      ; :
0210 ED                 252             MOV     A,TOTAL_HI      ; :
0211 33                 253             RLC     A               ; :
0212 FD                 254             MOV     TOTAL_HI,A      ; /
                        255
                        256     OVERFLOWED:
0213 E4                 257             CLR     A
0214 F535               258             MOV     ZEROS,A
0216 F536               259             MOV     ONES,A
0218 F537               260             MOV     TWOS,A
021A F538               261             MOV     THREES,A
021C F539               262             MOV     FOURS,A
021E 7B00               263     DONE:   MOV     PULSE_HI,#0
0220 7C00               264             MOV     PULSE_LO,#0
0222 7A00               265             MOV     QUAN,#0
0224 211A               266             AJMP    MAIN_LOOP
                        267
                        268             END

XREF SYMBOL TABLE LISTING
---- ------ ----- -------
N A M E              T Y P E     V A L U E       ATTRIBUTES AND REFERENCES
ACC. . . . . . . . . D ADDR      00E0H    A      123 156
ADDPULSE . . . . . . C ADDR      0143H    A      104 107#
AROUND . . . . . . . C ADDR      01D0H    A      210 212#
AVERAGE. . . . . . . C ADDR      01C3H    A      201#
B. . . . . . . . . . D ADDR      00F0H    A      209 210
CONT . . . . . . . . C ADDR      0182H    A      153 155#
CONTO1 . . . . . . . C ADDR      01B6H    A      173 194#
CONTO2 . . . . . . . C ADDR      01D7H    A      194 217#
CONTO3 . . . . . . . C ADDR      01E9H    A      217 227#
DNTIME . . . . . . . REG         R1              13# 71 104 106 143 147
DONE . . . . . . . . C ADDR      021EH    A      154 180 214 224 234 243 263#
DOUBLE . . . . . . . C ADDR      01D9H    A      218# 235
DOUBLES_HI . . . . . D ADDR      003EH    A      41# 222 223
DOUBLES_LO . . . . . D ADDR      003FH    A      42# 219 220
DOUBLES. . . . . . . D ADDR      003EH    A      40# 41 42
FOURS. . . . . . . . D ADDR      0039H    A      33# 243 262
GLITCH . . . . . . . C ADDR      019CH    A      174#
GLITCHES_HI. . . . . D ADDR      003AH    A      35# 178 179
GLITCHES_LO. . . . . D ADDR      003BH    A      36# 175 176
GLITCHES . . . . . . D ADDR      003AH    A      34# 35 36
HALF_UNIT_HI . . . . D ADDR      0033H    A      27# 82 128 161
HALF_UNIT_LO . . . . D ADDR      0034H    A      28# 85 126 159
HALVE. . . . . . . . C ADDR      01AAH    A      182#
INITIALIZE . . . . . C ADDR      010FH    A      67#
LOOP . . . . . . . . C ADDR      0103H    A      58# 59
MAIN_LOOP. . . . . . C ADDR      011AH    A      78# 123 129 139 266
NOT_1_OR_2 . . . . . C ADDR      0154H    A      117 120#
NOT_1. . . . . . . . C ADDR      014FH    A      115 117#
OFFSET . . . . . . . D ADDR      0031H    A      25# 72 95 105 149
ONES . . . . . . . . D ADDR      0036H    A      30# 214 259
OVERFLOWED . . . . . C ADDR      0213H    A      192 215 256#
P0 . . . . . . . . . D ADDR      0080H    A      72 96
P1 . . . . . . . . . D ADDR      0090H    A      121 130 153 163
P2 . . . . . . . . . D ADDR      00A0H    A      69 90 91 92 93
PULSE_DONE . . . . . C ADDR      017DH    A      116 118 144 148 152#
PULSE_HI . . . . . . REG         R3              15# 112 113 122 127 136 138 155 160 169 171 206 209 263
PULSE_LO . . . . . . REG         R4              16# 108 110 125 133 135 158 166 168 203 264
QUAD . . . . . . . . C ADDR      01FBH    A      227 237#
QUADRUPLES_HI. . . . D ADDR      0042H    A      47# 241 242
QUADRUPLES_LO. . . . D ADDR      0043H    A      48# 238 239
QUADRUPLES . . . . . D ADDR      0042H    A      46# 47 48
QUAN . . . . . . . . REG         R2              14# 131 164 173 194 217 227 265
READ . . . . . . . . C ADDR      0128H    A      90#
RECORD . . . . . . . C ADDR      0199H    A      156 162 173#
SIG_NEG. . . . . . . C ADDR      0175H    A      99 146#
SIG_POS. . . . . . . C ADDR      013BH    A      102#
SIG_ZERO . . . . . . C ADDR      016FH    A      100 141#
SIGNAL . . . . . . . D ADDR      0032H    A      26# 97 109 115 117
SINGLE . . . . . . . C ADDR      01B8H    A      195#
SINGLES_HI . . . . . D ADDR      003CH    A      38# 199 200
SINGLES_LO . . . . . D ADDR      003DH    A      39# 196 197
SINGLES. . . . . . . D ADDR      003CH    A      37# 38 39
START. . . . . . . . C ADDR      0100H    A      53 56#

N A M E              T Y P E     V A L U E       ATTRIBUTES AND REFERENCES
TEMP . . . . . . . . D ADDR      0030H    A      24#
TF0. . . . . . . . . B ADDR      0088H.5  A      87 88
TH0. . . . . . . . . D ADDR      008CH    A      63
THREE_MILLISECONDS . NUMB        001EH    A      9# 70 103 142 150
THREES . . . . . . . D ADDR      0038H    A      32# 234 261
TMOD . . . . . . . . D ADDR      0089H    A      64
TOTAL_HI . . . . . . REG         R5              17# 20 183 185 212 213 252 254
TOTAL_LO . . . . . . REG         R7              19# 189 191 202 204 246 248
TOTAL_MI . . . . . . REG         R6              18# 21 186 188 205 207 249 251
TR0. . . . . . . . . B ADDR      0088H.4  A      65
TRIPLE . . . . . . . C ADDR      01EBH    A      228#
TRIPLES_HI . . . . . D ADDR      0040H    A      44# 232 233
TRIPLES_LO . . . . . D ADDR      0041H    A      45# 229 230
TRIPLES. . . . . . . D ADDR      0040H    A      43# 44 45
TWELEVE_MILLISECONDS NUMB        0078H    A      10# 71 106 143 147
```

```
TWICE. . . . . . . . C ADDR    0209H  A     225  245#
TWOS  . . . . . . .  D ADDR    0037H  A     31#  224  260
UNIT_HI. . . . . . . REG       R5           20#  61  68  80  137  170
UNIT_LO. . . . . . . REG       R6           21#  83  134 167
UPTIME . . . . . . . REG       R0           12#  70  103 142 148 150
WAIT . . . . . . . . C ADDR    0123H  A     87#  87
ZEROS. . . . . . . . D ADDR    0035H  A     29#  180 258

REGISTER BANK(S) USED: 0
ASSEMBLY COMPLETE, NO ERRORS FOUND
```

What is claimed:

1. A signal processor for processing a signal of an article sensor which generates a variable signal which has a relationship to the quantity of articles within the sensor, the signal processor comprising:

means for generating an offset value representing a steady state magnitude of the variable signal produced by the article sensor when no articles are in transit through the article sensor;

means for deriving a first value by subtracting an input value from the offset value, wherein the input value represents an actual magnitude of the variable signal;

means for deriving an area value by repetitively integrating the first value; and means for comparing the area value to an estimated area value and for generating an output signal when the area value is not less than the estimated area value.

2. The article sensor of claim 1, wherein the signal processor further comprises:

means for periodically adjusting the estimated area value.

3. The article sensor of claim 1, wherein the signal processor further comprises:

means for periodically adjusting the offset value in response to changes in the steady-state magnitude of the variable signal.

4. The article sensor of claim 1, wherein the signal processor further comprises:

means for generating a quantity value indicative of the number of articles in a group of articles which makes a transit through the article sensor; and means for periodically adjusting the estimated area value wherein the amount of adjustment varies, depending upon the quantity value.

5. In an article sensor having an article flow path, a beam generator and a beam detector oriented so that articles in the flow path interrupt at least a part of the beam and cause the beam detector to generate a variable signal, a signal processing method comprising the following steps:

(a) obtaining a signal value derived from the variable signal by subtracting a current value of the variable signal from an offset value representing a steady state level of the variable signal;

(b) adding the signal value to a predetermined pulse value to obtain an updated pulse value;

(c) comparing the updated pulse value to a threshold value; and (1) if the updated pulse value is less than the threshold value, repeating steps (b) and (c), otherwise;

(2) if the updated pulse value is not less than the threshold value, generating an output signal indicative of a transit of an article through the beam.

6. The signal processing method of claim 5, further comprising:

(d) upon the updated pulse value being not less than the threshold value, subtracting an estimated pulse area value from the updated pulse value to obtain a new predetermined pulse value; and (e) repeating steps (a)–(d).

7. The signal processing method of claim 6 further comprising:

upon the updated pulse value being not less than the threshold value, incrementing a quantity value; and modifying the estimated pulse area value, depending upon the quantity value.

8. The signal processing method of claim 6, further comprising:

upon the updated pulse value being not less than the threshold value, incrementing a quantity value;

if the quantity value has satisfied a first condition a predetermined number of times, then setting the quantity value equal to an initial quantity value before repeating steps (a)– (d);

if the quantity value repeatedly satisfied a second condition a predetermined number of times, then decreasing the estimated pulse area value and setting the quantity value to the initial quantity value before repeating steps (a)–(d); and if the quantity value satisfies a second condition a predetermined number of times, then increasing the estimated pulse area value and setting the quantity value to the initial quantity value before repeating steps (a)–(d).

9. The signal processing method of claim 5, further comprising:

increasing the offset value by a certain amount if the signal value satisfies a first condition for a certain time period; and decreasing the offset value by a predetermined amount if the signal value satisfies a second condition for a predetermined time period.

* * * * *

UNITED STATES PATENT AND TRADEMARK OFFICE
CERTIFICATE OF CORRECTION

PATENT NO. : 4,635,215

DATED : 6 January 1987

INVENTOR(S) : Kenneth Dale Friend

It is certified that error appears in the above-identified patent and that said Letters Patent is hereby corrected as shown below:

Col. 16, line 41, delete "second" and insert -- third --.

Signed and Sealed this

Thirty-first Day of May, 1988

Attest:

DONALD J. QUIGG

Attesting Officer

Commissioner of Patents and Trademarks